United States Patent [19]

Yeh et al.

[11] 4,269,481

[45] May 26, 1981

[54] MULTIPLE-CAVITY ELECTRO-OPTIC TUNABLE FILTER

[75] Inventors: Pochi A. Yeh; John M. Tracy, both of Thousand Oaks, Calif.

[73] Assignee: Rockwell International Corporation, El Segundo, Calif.

[21] Appl. No.: 55,248

[22] Filed: Jul. 6, 1979

[51] Int. Cl.³ .............................................. G02F 1/03
[52] U.S. Cl. ............................. 350/356; 331/94.5 M
[58] Field of Search ...................... 350/356, 353, 355; 331/94.5 C, 94.5 M

[56] References Cited

U.S. PATENT DOCUMENTS

| 3,572,898 | 3/1971 | Harlow | 350/356 |
| 3,644,017 | 2/1972 | Ploss | 350/356 |

OTHER PUBLICATIONS

"Induced Transmission in Absorbing Films Applied to Band Pass Filter Design", by Berning et al.; 47J Opt. Soc. of America, pp. 230–239, (Mar. 1957).

"A Tunable Narrow-Band Optical Filter", by Billings, 37 Jour. Opt. Soc. of America, vol. 37, No. 10, (Oct. 1947), pp. 738–746.

Primary Examiner—William L. Sikes
Assistant Examiner—Leon Scott
Attorney, Agent, or Firm—H. Fredrick Hamann; Craig O. Malin; John J. Deinken

[57] ABSTRACT

A multiple cavity electro-optic tunable filter includes an ordered row of n electro-optically tunable plates (n=2, 3, 4 . . . ), each plate having an incident surface and an emergent surface, an incident reflective coating on the incident surface of the first tunable plate in the row, an emergent reflective coating on the emergent surface of the nth tunable plate in the row, and a series of (n−1) absorbent films, one of the films being disposed between each pair of adjacent plates in the row in mating contact with the adjacent surfaces of the adjacent plates.

19 Claims, 14 Drawing Figures

MULTIPLE-CAVITY ELECTRO-OPTIC TUNABLE FILTER

BACKGROUND OF THE INVENTION

This invention relates to the field of optical filters and more particularly to tunable optical filters.

Optical bandpass filters whose transmission characteristics may be controlled by the application of DC voltages are useful in a variety of different applications, such as optical signal processing, high resolution spectroscopy, solar physics, astrophysics, high pressure tunable lasers, and infrared focal plane technology.

A number of such filter designs are known, including narrow band optical tunable filters known as Solc filters, Lyot-Ohman filters, and chirped multi-layer filters. An electro-optic tunable filter of the Lyot-Ohman type, for example, was first demonstrated in the visible spectrum by Billings. See B. H. Billings, 37 Journal of the Optical Society of America 738 (1947). In this filter, three quartz plates having thicknesses in the ratio 1:2:4 provide fixed phase retardations. Three ADP plates are employed as the tunable phase retardation plates.

The Lyot-Ohman type of filter, however, as well as the other types mentioned above, requires many polarizers, large crystals, and many electrodes in order to achieve a wide spectral tuning range. Because of the large number of oriented crystal layers which are required, reflection losses and surface scatterings at the crystal layer surfaces are major causes of low transmission through such prior art filters. In addition, in most tunable filter applications, the longitudinal electro-optic effect must be utilized so that a large aperture may be realized. This constraint, however, creates a serious electrode problem for both the Lyot-Ohman and Solc type of filter, since each crystal plate in such filter designs must then have associated with it a pair of electrodes through which the filtered light must pass. Such multiple electrodes tend to further decrease the transmission of incident light through the filter and thus an electro-optic tunable filter having a minimum number of electrodes is desirable.

SUMMARY OF THE INVENTION

It is a general object of this invention to provide a new and improved electro-optic tunable filter.

A multiple cavity electro-optic tunable filter, according to this invention, includes an ordered row of n electro-optic tunable plates (n=2, 3, 4 . . . ), each plate including an incident surface and an emergent surface, an incident reflective coating on the incident surface of the first tunable plate in the row, an emergent reflective coating on the emergent surface of the nth tunable plate in the row, and a series of (n−1) absorbent films, one of the films being disposed between each pair of adjacent plates in the row in mating contact with the adjacent surfaces of the adjacent plates.

In a more particular embodiment, the incident and emergent reflective coatings and the films are metallic coatings, the films being approximately 200 Å thick. The plates may be Z-cut electro-optic crystals having a point group of 4, 4 mm, 3, 3 m, 6, or 6 mm.

The plates may be of different thicknesses, the differences in thickness being large enough to suppress undesirable side lobes in the spectrum transmitted by the filter.

In a preferred embodiment, the ordered row includes two electro-optic tunable plates having thicknesses in the ratio $1:(1-G^{-1})$, where the value of G is chosen to increase the free spectral tuning range of the filter while maintaining sufficient off-band rejection. In another embodiment, the ordered row includes four electro-optic tunable plates having thicknesses in the ratio $1:(1-G^{-1}):(1-G^2):(1-G^{-1})(1-G^{-2})$. An additional embodiment may include four plates having thicknesses in the ratio 1:2:4:8.

Examples of the more important features of the invention have been broadly outlined in this Summary in order to facilitate an understanding of the detailed description that follows and so that the contributions which this invention provides to the art may be better appreciated. There are, of course, additional features of the invention which will be further described below and which are included within the subject matter of the appended claims.

BRIEF DESCRIPTION OF THE DRAWINGS

Additional objects, features, and advantages of the present invention will become apparent by referring to the detailed description below of the preferred embodiments in connection with the accompanying drawings, wherein like reference numerals refer to like elements throughout all the figures. In the drawing.

DESCRIPTION OF THE PREFERRED EMBODIMENT

Multilayer interference filters, which are extensively used in many important optical applications, are generally constructed from nonabsorbing dielectric layers in order to effect a high transmittance of light through the filter. The Fabry-Perot type of interference filter, for example, consists of a single optical resonant cavity which can be formed by placing a high reflectance coating on each side of a dielectric spacer. It can be shown that the transmission spectrum for such a filter consists of a series of equally spaced peaks which occur at frequencies $v$ which satisfy the relationship:

$$v = m(c/2nl) + v_o \qquad (1)$$

where:
n = refractive index,
l = length of the cavity, m is an integer,
c = velocity of light in vacuo,
$\nu_0$ is a constant.

As can be seen from Equation 1, spectral tuning may be achieved with such a filter by inducing a change in the refractive index n of the dielectric spacer.

Working from Equation 1, the expression for the change $d\nu$ in the resonant frequency of a given transmission peak due to a change in the refractive index of the cavity medium, dn, is:

$$d\nu/\Delta\nu = -dn/(\lambda/2l) \quad (2)$$

where:
$\Delta\nu$ = intermode frequency separation (free spectral range),
$\lambda$ = wavelength of light.

As shown by Equation 2, the peak transmission frequency of the filter may be tuned by $\Delta\nu$ by changing the refractive index of the cavity medium by a quantity $\lambda/2l$. With the cavity medium selected from a Z-cut electro-optical crystal having point groups 4, 4 mm, 3, 3 m, 6, or 6 mm, the change in the refractive index due to the electric field is given by:

$$dn = -\tfrac{1}{2} n_o^3 r_{13} E_3 \quad (3)$$

where:
$n_o$ = the ordinary refractive index of the crystal,
$r_{13}$ = the relevant electro-optic coefficient,
$E_3$ = the electric field.

Equations 2 and 3 can be combined to obtain an expression for the voltage needed to tune the peak transmission frequency by one free spectral range:

$$V = \pm \lambda/2 \, n_o^3 \, r_{13} \quad (4)$$

Figure 1:
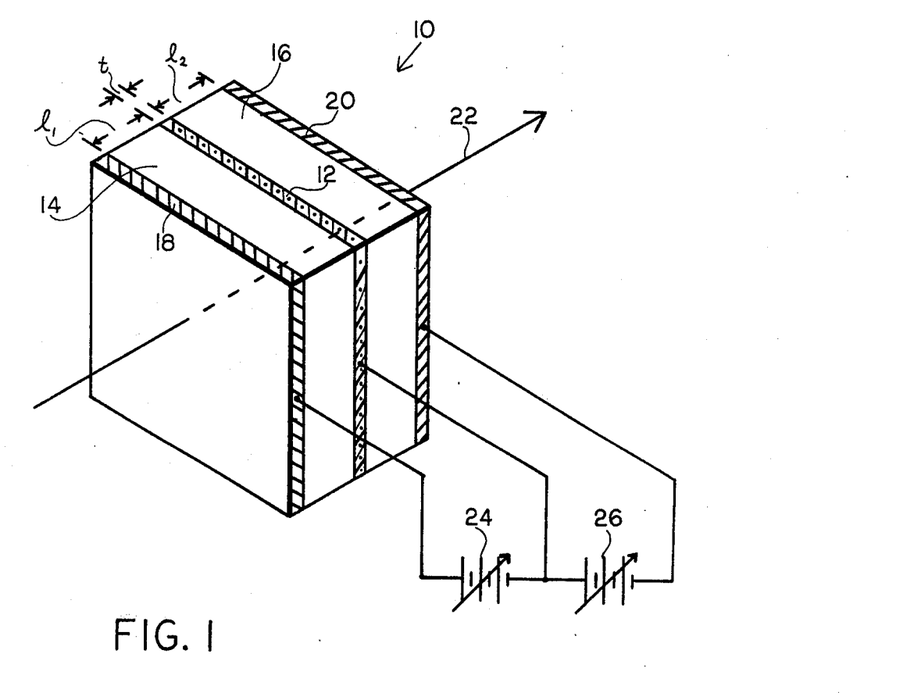
FIG. 1 is an isometric view of a two cavity electro-optic tunable filter according to the present invention.

A single cavity Fabry-Perot interference filter, however, is actually useful only in spectral analysis limited to one free spectral range (c/2nl), a range which is too limited for many applications. It is an outstanding feature of the present invention to provide a multi-cavity electro-optic tunable filter which will increase the free spectral range and the tuning range available. As illustrated in FIG. 1, the invention is embodied in a two-cavity electro-optic tunable filter 10. The filter 10 includes an absorbing layer 12 sandwiched between two electro-optic crystal plates 14 and 16, which have slightly different thicknesses. The incident surface and the emergent surface of the filter are coated with high reflectance coatings 18 and 20, respectively, with the path of light through the filter being illustrated by the arrow 22. The refractive indices of the crystals 14 and 16 are controlled by variable power supplies 24 and 26, respectively, the voltages of which are applied to the plates through the absorbing layer and the reflective coatings. The thicknesses of the crystal plates are different in order to suppress the undesired sidebands and to increase the free spectral tuning range of the filter, as will be further discussed below.

The general optical properties of metal-dielectric multilayer interference filters have been studied extensively. The use of a single metal film surrounded by dielectric stacks in a band-pass filter has been examined, for example, by Burning and Turner, who demonstrated both theoretically and experimentally that a reasonably thick film of certain metals, notably metals with a high k/n ratio, can be induced to transmit a surprising amount of energy of a particular wavelength when such a film is surrounded by suitably chosen interference dielectric film combinations. See P. H. Berning and A. F. Turner, 47 Journal of the Optical Society of America 230 (1957), the teachings of which are hereby incorporated by reference. This phenomenon is known as "induced transmission".

One of the most important concepts involved in induced transmission is that of "potential transmittance". The potential transmittance $\psi$ of a metal film is defined as the ratio of the flux emerging from the film to that entering the film:

$$\psi = S_{out}/S_{in} = T/(1-R) \quad (5)$$

where:
$S_{in}$ = Poynting power flow of the radiation entering the metal film,
$S_{out}$ = Poynting power flow of the radiation leaving the metal film,
R = fraction of incident Poynting power flow reflected from the metal film,
T = fraction of incident Poynting power flow transmitted through the metal film.

For a dielectric lossless film, it can be seen from Equation 5 that $\psi = 1$. In addition, for a multilayer stack consisting of more than one absorbing layer, the potential transmittance of the whole stack will equal the product of the individual potential transmittances of each of the absorbing layers.

Physically, the potential transmittance represents the maximum radiation throughput that can potentially be transmitted by an absorbing stack if the net input radiant flux is maintained through an appropriate anti-reflection coating (i.e., R=0). In other words, $\psi$ represents the radiation energy throughput per unit flux on the incident side. For a given absorbing layer (or multilayer), the potential transmittance $\psi$ can be maximized by an appropriate reflectance matching on the emergent side of the absorbing layer. Furthermore, it has been shown that the potential transmittance of an absorbing layer remains constant with any dielectric coating on the incident side. In other words, the potential transmittance $\psi$ of an absorbing layer depends only on the optical properties of the absorbing film and on the optical properties of the dielectric backing system. Therefore, if r exp (i$\delta$) is the complex reflection amplitude at the emergent boundary of a metal film (as seen from the metal film), the potential transmittance $\psi$ can be shown to be:

$$\psi = \frac{n \sinh(\log r) + k \sin(\delta)}{n \sinh\left(\log r - \frac{4\pi k t}{\lambda}\right) + k \sin\left(\delta - \frac{4\pi n t}{\lambda}\right)} \quad (6)$$

where:
n = the refractive index of the metal film,
k = the extinction coefficient of the metal film,
t = the film thickness,
$\lambda$ = the wavelength.

For a given metal film having a fixed index of refraction and a fixed thickness, $\psi$ may be considered to be a function of r and $\delta$. If r and $\delta$ can be varied independently, $\psi$ may thus reach its maximum value, the maximum potential transmittance $\psi_{max}$, at a unique complex reflectance $r_m \exp(i \delta_m)$. $\psi_{max}$ is the maximum achievable energy throughput of a metal film in perfect dielectric surroundings, and is given by:

$$\psi_{max} = u - \sqrt{u^2 - 1} \tag{7}$$

where: $u = \dfrac{n^2 \cosh(4\pi kt/\lambda) + k^2 \cos(4\pi nt/\lambda)}{n^2 + k^2}$.

Thus, the potential transmittance $\psi$ of a metal film can range in value anywhere from zero to $\psi_{max}$, depending on the dielectric backing system for the film. For certain materials of a reasonable thickness, this range can be surprisingly broad. For a silver film of 200 Å embedded in $LiNbO_3$, for example, the transmission is less than 3% and the potential transmittance $\psi$ is only 30%. The maximum potential transmittance $\psi_{max}$, however, is 93%. It may be noted that $\psi$ for a metal film depends on its dielectric backing system, while $\psi_{max}$ depends only on the thickness and the complex refractive index of the film.

Figure 2:
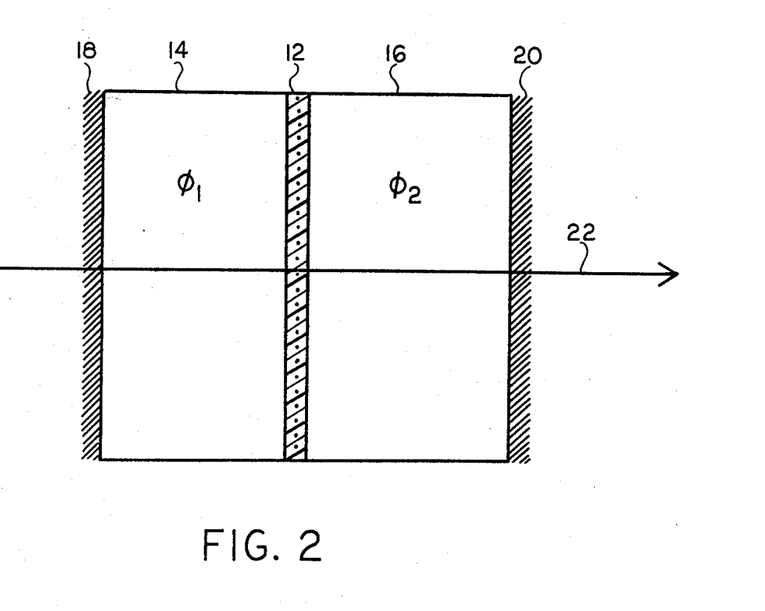
FIG. 2 is a cross-sectional view of the filter shown in FIG. 1, along the line 2—2.
Figure 3:
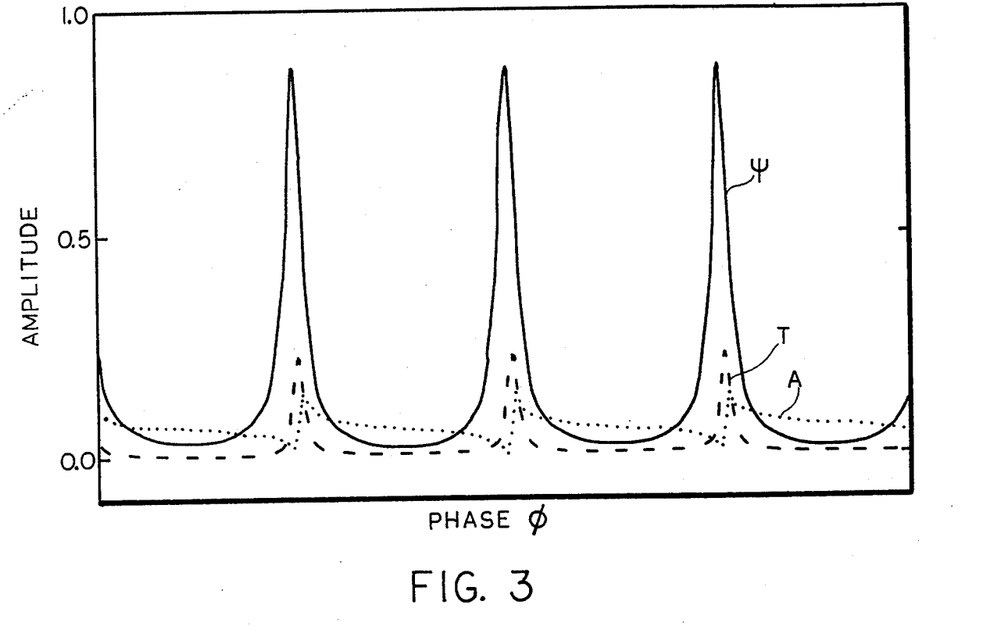
FIG. 3 is a graphical representation showing the spectral responses of various parameters for the second cavity of the filter illustrated in FIG. 1, as a function of the phase $\phi$.

The two cavity filter structure illustrated in FIG. 1 is also illustrated in a cross-sectional side view in FIG. 2, where $\phi_1$ and $\phi_2$ represent the round trip phase excursions for the first and second cavities 14 and 16, respectively. In the case of this two cavity filter structure, the potential transmittance $\psi$ of the metal film 12 and the desired passband wavelength depend on the round trip phase excursion $\phi_2 = 4\pi n_2 l_2/\lambda$, of the light in the second cavity. Equation 5 indicates that $\psi$ is a periodic function of $\phi_2$, with a period $2\pi$, since both R and T are periodic functions of $\phi_2$. The spectral responses of $\psi$, T, and the absorptance A of the second cavity 16, as viewed from the first cavity 14, are illustrated in FIG. 3. As can be seen in FIG. 3, the FWHM (Full Width at Half Maximum) of the potential transmittance peak is relatively larger than that of the transmission peak. These two peaks, in general, do not occur at the same wavelength. They always have a strong overlap, however, because R and T vary significantly only around the spectral regimes where T reaches its maximum. Therefore, according to the definition of $\psi$ in Equation 5, the peaks of the potential transmittance must occur near the Fabry-Perot transmission peaks. It may also be noted that the peak potential transmittance occurs at a frequency very near the minimum absorption. This interesting property remains true whenever the minimum absorption is very close to zero.

In a tunable filter, the phases $\phi_1$ and $\phi_2$ may be electro-optically tuned. In particular, if the cavity media are electro-optic Z-cut uniaxial crystals having point groups 4, 4 mm, 3, 3 m, 6, or 6 mm, the phase tuning $d\phi$ is given by $$d\phi_i = 2\pi/\lambda n_o^3 r_{13} V_i, \quad i=1, 2 \tag{8}$$

where:

$V_{1,2}$ = the voltage drops across the cavities.

To obtain a passband at a desired wavelength $\lambda_0$, $\phi_2$ is adjusted electro-optically until $\psi$ reaches its peak value, then $\phi_1$ is adjusted until the transmission peaks at the desired wavelength (or equivalently, until the desired wavelength is anti-reflective). The first step may be denoted potential transmittance optimization through electro-optic phase tuning. This step creates a series of peak potential transmittances around the desired passband $\lambda_o$, i.e., $\lambda_o \pm \lambda_o^2/2n_o l_2$, $\lambda_o \pm 2\lambda_o^2/2n_o l_2$, ... The second step may be denoted reflection minimization through electro-optic phase tuning. The step will have a similar effect at a series of wavelengths around $\lambda_o$, i.e., $\lambda_o \pm \lambda_o^2/2n_o l_1$, $\lambda_o \pm 2\lambda_o^2/2n_o l_1$, ... By choosing cavities with different thicknesses, $l_1 \neq l_2$, offband transmissions can be suppressed. More precisely, if the desire passband is at $\lambda_o$, the first set of side bands will be approximately at $\lambda_o \pm \lambda_o^2/2n_o|l_1 - l_2|$. The difference $|l_1 - l_2|$ must be large enough to suppress the side lobes. Generally speaking, the difference in the mode spacing of the individual cavities ($\lambda_o^2/2n_o l_2 - \lambda_o^2/2n_o l_1$) must be greater than the bandwidth (FWHM) of the potential transmittance peak. In other words, the fractional difference in the cavity thicknesses must be roughly 1/F where F is the effective finesse of the cavity as far as the potential transmittance spectrum is concerned, i.e., F is equal to the free spectral range divided by the full width at half maximum. The spectral tuning range of the two cavity structure is:

$$\Delta\lambda/\lambda \sim F(\Delta n/n) \tag{9}$$

where:

$\Delta n/n$ = the fractional tuning range of the refractive indices,

F = the finesse of the individual Fabry-Perot "sandwich".

The width of the passband is given by $$\Delta\lambda_{\frac{1}{2}} = \lambda^2/2nlF \tag{10}$$

This width can be made as small as 1 Å. The effective finesse of the whole structure is thus $F^2$, and the angular aperture of the device is given by $$\theta_{\frac{1}{2}} = n_o(n_e/n_o)(\Delta\lambda_{\frac{1}{2}}/\lambda)^{\frac{1}{2}}. \tag{11}$$

The second factor ($n_e/n_o$) accounts for the effect of anisotropy of the crystal. Thus, a positive uniaxial crystal is desirable for a large aperture. For a passband width of approximately 100 Å at $\lambda = 5$ μm and $n \sim 2.2$, the angular aperture is $\pm 5°$. The spectral tuning range can be increased by simply adding more stages. It is important, however, to determine the optimum thickness for the metal absorbing film in order to achieve the highest efficiency.

Figure 4:
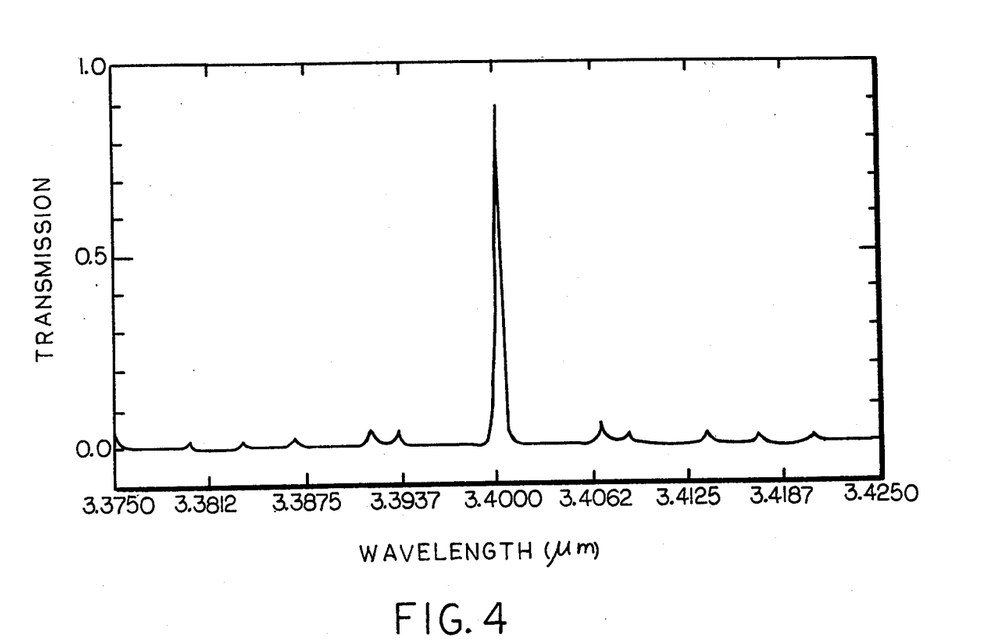
FIG. 4 is a graphical illustration of a typical transmission spectrum for a two-cavity filter built according to the invention.

By varying the phase, $\phi_i$, independently from $-\pi$ to $\pi$, the two-cavity tunable filter has a free spectral tuning range of ($\lambda_o 2/2n_o|l_1 - l_2|$). The transmission characteristics depend on the reflectivities of the coatings 18 and 20, the refractive index and thickness of the metal film 12, and as well on the cavity thickness. Where the filter is to be used in the visible portion of the spectrum, each of the coatings 18 and 20 may consist of a metal layer deposited to a suitable thickness. Such metallic coatings, however, do not exhibit optimal properties in other regions of the optical spectrum. In the infrared region, for example, it is preferable to provide incident and emergent refective coatings in the form of stacked dielectric mirrors. In the latter applications, a transparent semiconductor or metal electrode can be included at each surface to provide a connection for applying a voltage to each crystal plate. The spectral response of the device may be obtained by using the conventional matrix method. A typical transmission spectrum for a two-cavity tunable filter is illustrated in FIG. 4. The side lobes in FIG. 4 are present as a result of the partial overlap of the side bands of the potential transmittance spectrum and the antireflection spectrum. Because of the difference in cavity lengths, the free spectral range is effectively increased by a factor of $l_1/|l_1 - l_2|$.

If the standing wave pattern is studied at the peak transmission, one of the intensity minima can be found at the absorbing layer. This configuration ensures minimum absorption loss for the desired passband, as well as achieving mode suppression for the side lobes. This result agrees with the use of reflectance matching to maximize the potential transmittance.

Figure 5:
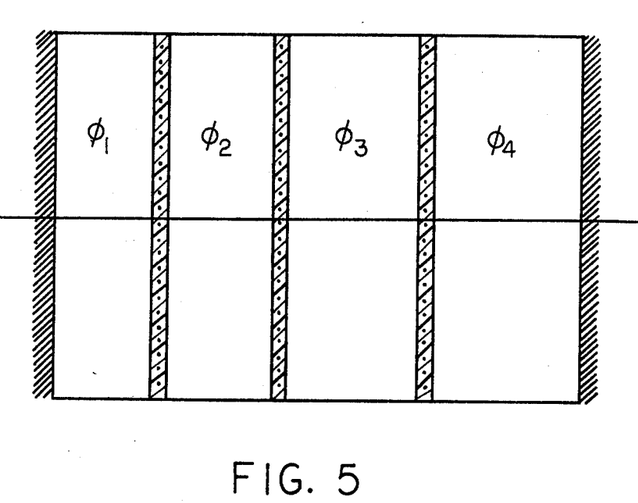
FIG. 5 is a cross-sectional side view illustrating the geometry of a four cavity tunable filter according to the present invention.

The two-cavity electro-optic tunable filter increases the free spectral tuning range for such a filter. To further increase the free spectral tuning range, the same techniques can be extended to a multiple cavity electro-optical tunable filter, such as a four-cavity or eight-cavity filter. In such a case, the two-cavity filter is considered to be the new building block for the four-cavity filter, etc. The cavity lengths of the second two-cavity filter must be properly chosen to avoid the overlaps of the sidebands. The whole structure then will consist of three absorbing layers embedded in four electro-optic crystal plates. A cross-sectional side view of such a four-cavity filter is illustrated in FIG. 5. This filter can be tuned to a desired passband $\lambda_o$ by first adjusting $\phi_4$ of the fourth cavity until the potential transmittance $\psi_3$ of the third metal film peaks at $\lambda_o$, adjusting $\phi_3$ of the third cavity until the potential transmittance $\psi_2$ of the second metal film also peaks at $\lambda_o$, and adjusting $\phi_2$ of the second cavity until the potential transmittance $\psi_1$ of the first metal film also peaks at $\lambda_o$. The overall potential transmittance $\psi$ of the whole structure is then given by $\psi = \psi_1\psi_2\psi_3$. The final step is to adjust $\phi_1$ of the first cavity to antireflect the light at $\lambda_o$. The extension of this process to the tuning of other multiple cavity electro-optic tunable filters will be obvious to those skilled in the art.

A multiple-cavity electro-optic tunable filter may be constructed with many combinations of cavity thicknesses to achieve the effect of increasing the free spectral tuning range. One class of multiple cavity filter structures of particular importance is shown in Table I.

TABLE I.

CAVITY THICKNESS RATIOS

| Cavity | 2-Cavity EOTF | 4-Cavity EOTF | 8-Cavity EOTF |
|---|---|---|---|
| 1 | 1 | 1 | 1 |
| 2 | $(1-G^{-1})$ | $(1-G^{-1})$ | $(1-G^{-1})$ |
| 3 |  | $(1-G^{-2})$ | $(1-G^{-2})$ |
| 4 |  | $(1-G^{-1})(1-G^{-2})$ | $(1-G^{-1})(1-G^{-2})$ |
| 5 |  |  | $(1-G^{-4})$ |
| 6 |  |  | $(1-G^{-1})(1-G^{-4})$ |
| 7 |  |  | $(1-G^{-2})(1-G^{-4})$ |
| 8 |  |  | $(1-G^{-1})(1-G^{-2})(1-G^{-4})$ |
| Free Spectral Tuning Range | $(c/2nl)G$ | $(c/2nl)G^3$ | $(c/2nl)G^7$ |

Figure 6:
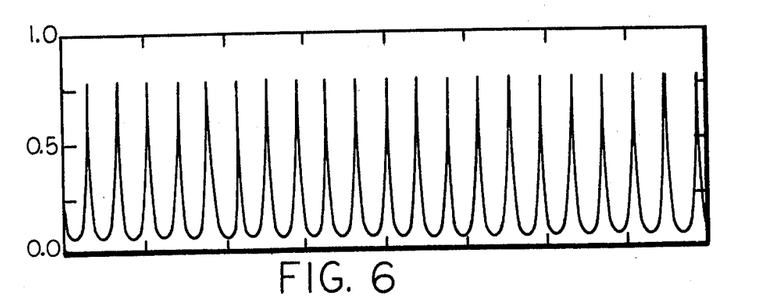
FIGS. 6–9 illustrate the spectral responses for various cavity combinations of the four cavity tunable filter illustrated in FIG. 5.
Figure 7:
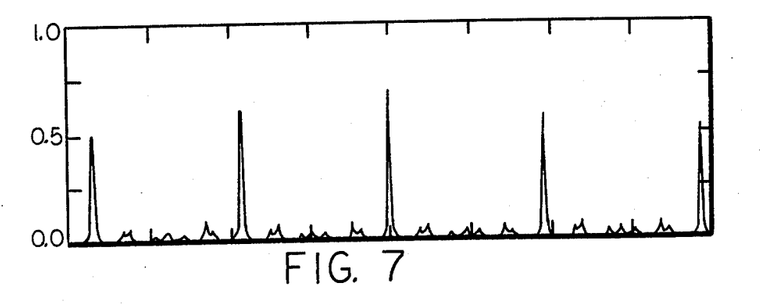
Figure 8:
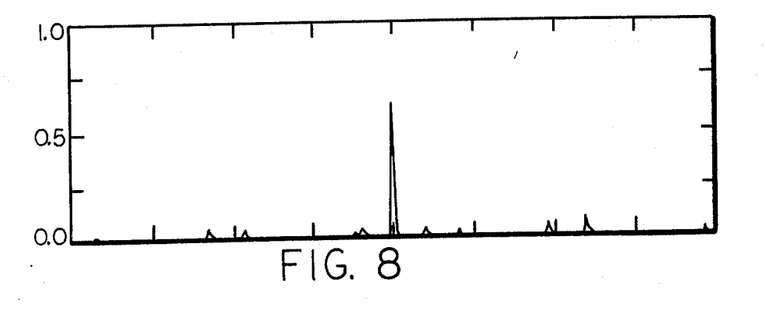
Figure 9:
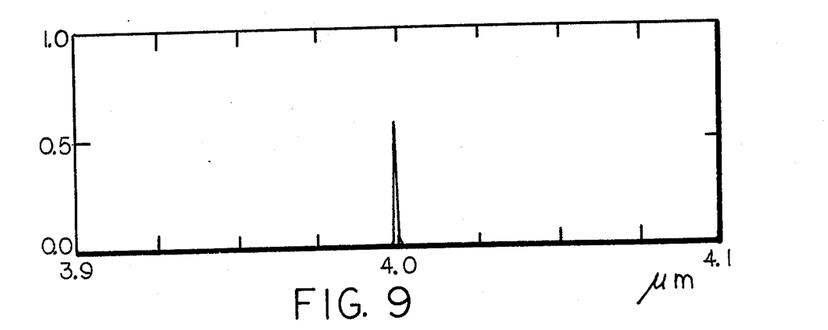

G is a parameter whose value is chosen to be less than the effective finesse F and is selected to increase the free spectral tuning range without introducing excessive offband transmission. In a two cavity filter, $G^{-1}$ is the fractional difference in the cavity thicknesses. The free spectral tuning range is $(c/2nl)G^3$ in a four-cavity tunable filter. The choice of a proper G depends on the desired tuning range as well as on the effective finesse F of the potential transmittance spectrum for the first (or last) cavity. The effective finesse F depends on the reflectivity of the mirrors as well as on the thickness and refractive index of the metal film. A calculated transmission spectrum for a four-cavity electro-optic tunable filter having a value of G=5 is shown in FIGS. 6-9. FIG. 6 is the potential transmittance of the third metal film $\psi_3$. FIG. 7 represents the transmittance $\psi_2\psi_3$, while FIG. 8 is $\psi_1\psi_2\psi_3$. FIG. 9 plots the overall transmission of the filter and illustrates a remarkable offband rejection for this design, as well as a large free spectral range.

Figure 10:
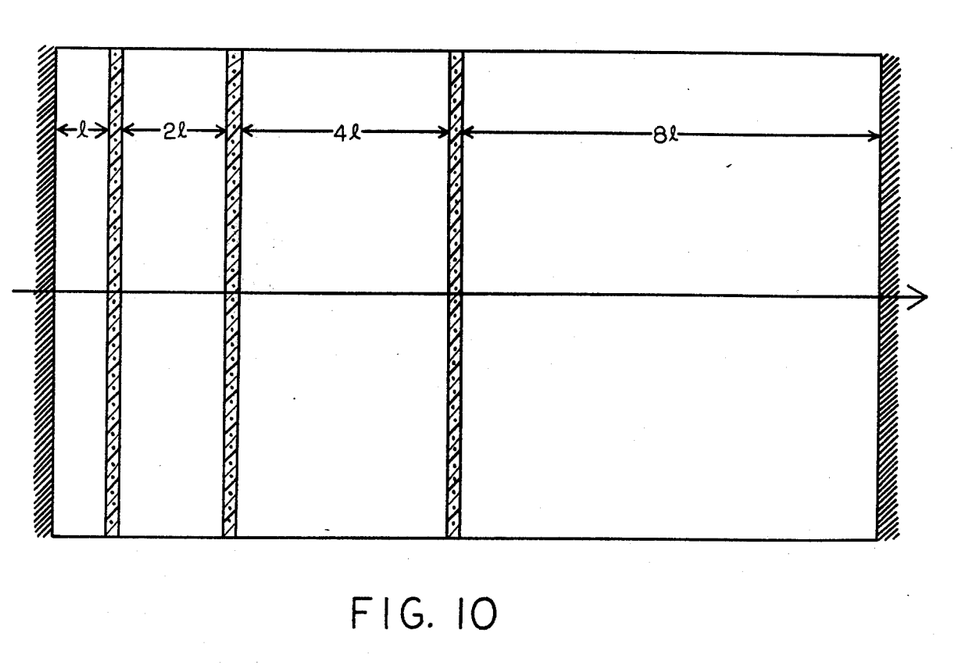
FIG. 10 is a cross-sectional side view illustrating an alternative four cavity tunable filter structure.
Figure 11:
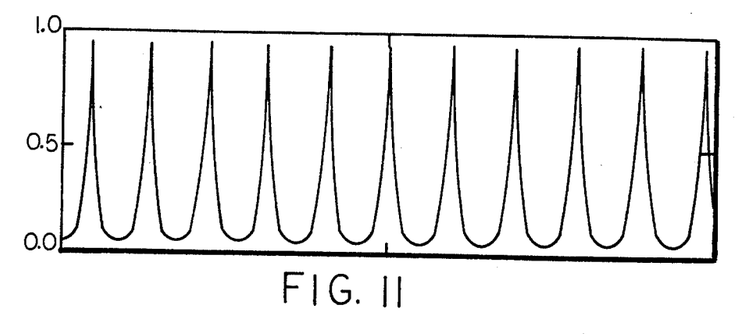
FIGS. 11–14 illustrate the spectral responses obtained for different cavity combinations of the four cavity tunable filter structure illustrated in FIG. 10.
Figure 12:
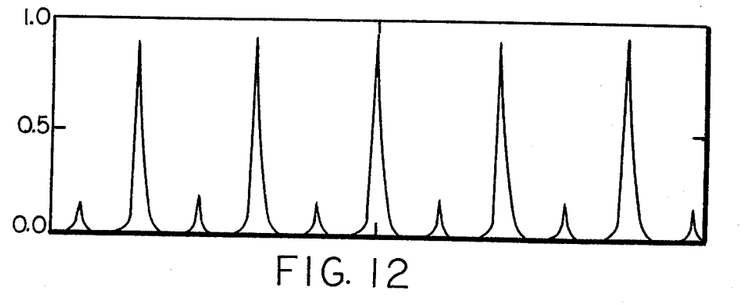
Figure 13:
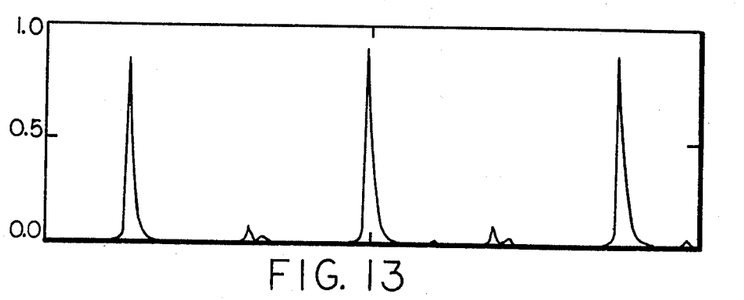
Figure 14:
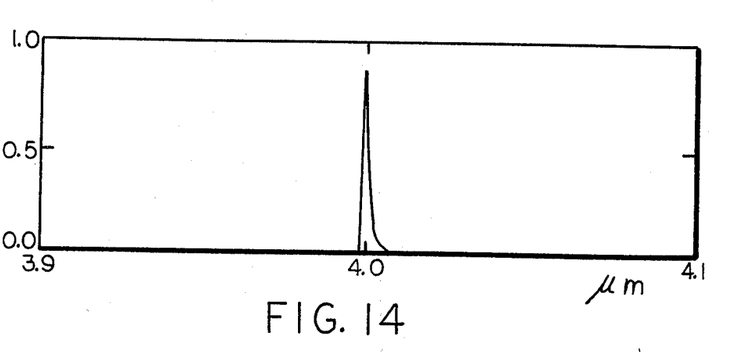

Another multiple cavity tunable filter structure is shown in FIG. 10. The cavity thicknesses of this filter are set in the ratio 1:2:4:8. Again, the potential transmittance of the overall filter structure is the product of the potential transmittances of all the individual metal films. The individual potential transmittances for this design are periodic functions of $1/\lambda$ with a period ratio 1:2:4:8. The net result is similar to that of the Lyot-Öhman filter, i.e., the bandpass width is determined by the thickest plate, while the free spectral tuning range is determined by the thinnest plate. A calculated transmission spectrum for this type of electro-optically tunable filter with four cavities is shown in FIGS. 11-14. As in FIGS. 6-9, FIG. 11 represents the potential transmittance of the third metal film $\psi_3$, FIG. 12 illustrates $\psi_2\psi_3$, FIG. 13 illustrates $\psi_1\psi_2\psi_3$, and FIG. 14 indicates the transmittance for the overall filter structure. In this example, the metal films were made of silver and were 100 Å thick. The cavities used were 25 microns, 50 microns, 100 microns, and 200 microns thick LiNbO$_3$, respectively.

Thus, the concepts of induced transmission and reflectance matching have been demonstrated to be useful in conjunction with electro-optic phase tuning in the design of a multiple cavity electro-optic tunable filter consisting of metal-dielectric multilayers. The free spectral tuning range is increased by a properly chosen combination of dielectric cavity thicknesses, while a remarkably high in-band transmission and off-band rejection may be obtained by selecting absorbing layers from the proper materials. A combination of two or more conventional Fabry-Perot cavities can be envisioned to accomplish the filtering function provided by this invention. The Fabry-Perot combination would be incoherent, however, as compared to the inherently coherent nature of a filter made according to the present invention, in which the cavities are separated only by thin metallic films. Several disadvantages would be exhibited by the Fabry-Perot combination. Where the filtering task is to be accomplished in an optical imaging application, for example, the multiple Fabry-Perot filter would be undesirable because of its inherently bulkier format, necessitating a longer optical path than would be required for travel through a filter made according to this invention. In addition, the induced transmission feature of the present invention permits a significantly higher transmission as compared to a multiple Fabry-Perot design. Furthermore, a filter manufactured in accordance with this invention is simpler and thus should be more cost effective than the multiple, noncoherent design.

In conclusion, although typical embodiments of the present invention have been illustrated and discussed herein, numerous modifications and alternative embodiments of the apparatus and method of this invention will be apparent to those skilled in the art in view of this description. The invention may be utilized, for example, in electro-optic tunable filters having different numbers of cavities, and different relative thicknesses, than those specifically illustrated in this application. Accordingly, this description is to be considered as illustrative only and is provided for the purpose of teaching those skilled in the art the manner of constructing the apparatus of this invention. Furthermore, it should be understood that the forms of the invention depicted and described herein are to be considered as the presently preferred embodiments. Various changes may be made in the configurations, sizes, and arrangements of the components of the invention, as will be recognized by those skilled in the art, without departing from the scope of the invention. Equivalent elements, for example, might be substituted for those illustrated and described herein, parts or connections might be reversed or otherwise interchanged, and certain features of the invention might be utilized independently of the use of other features, all as will be apparent to one skilled in the art after receiving the benefit obtained through reading the above description of the invention.

What is claimed is:

1. A multiple cavity electro-optic tunable filter, comprising:
    an ordered row of n electro-optically tunable plates (n=2, 3, 4, . . . ), each plate including an incident surface and an emergent surface;
    an incident reflective coating on the incident surface of the first tunable plate in said row;
    an emergent reflective coating on the emergent surface of the nth tunable plate in said row; and
    a series of (n−1) absorbent metallic films, one of said films being disposed between each pair of adjacent plates in said row in mating contact with the adjacent surfaces of said adjacent plates.

2. The filter of claim 1, wherein said incident and emergent reflective coatings are electrically conductive.

3. The filter of claim 2, wherein each of said reflective coatings further comprises:
    a stacked dielectric mirror; and
    an electrically conductive layer.

4. The filter of claim 3, wherein said electrically conductive layer comprises a metallic electrode.

5. The filter of claim 3, wherein said electrically conductive layer comprises a transparent semiconductor.

6. The filter of claim 1, wherein each of said metallic films is approximately 200 Å thick.

7. The filter of claim 6, wherein said metallic films comprise silver films.

8. The filter of claim 1, wherein each of said plates comprises an electro-optic crystal.

9. The filter of claim 8, wherein each of said crystals further comprises a Z-cut electro-optic crystal having a point group selected from the group consisting of 4, 4 mm, 3, 3 m, 6, and 6 mm.

10. The filter of claim 9, wherein each of said crystals comprises a $LiNbO_3$ crystal.

11. The filter of claim 1, wherein said ordered row comprises two electro-optically tunable plates of different thicknesses, the difference in thickness being large enough to suppress spectral side lobes transmitted by the filter.

12. The filter of claim 1, wherein said ordered row comprises two electro-optically tunable plates having thicknesses in the ratio $1:(1-G^{-1})$, where the value of G is chosen to increase the filter free spectral tuning range while maintaining sufficient off-bandd rejection.

13. The filter of claim 1, wherein said ordered row comprises four electro-optically tunable plates.

14. The filter of claim 13, wherein said plates have thicknesses in the ratio $1:(1-G^{-1}):(1-G^{-2}):(1-G^{-1})(1-G^{-2})$, where the value of G is chosen to increase the free spectral tuning range of the filter while maintaining sufficient off-band rejection.

15. The filter of claim 13, wherein said plates have thicknesses in the ratio 1:2:4:8.

16. The filter of claim 1, wherein said ordered row comprises eight electro-optically tunable plates.

17. The filter of claim 12, wherein said plates have thicknesses in the ratio $1:(1-G^{-1}):(1-G^{-2}):(1-G^{-1})(1-G^{2}):(1-G^{-4}):(1-G^{-1})(1-G^{-4}):(1-G^{-2})(1-G^{-4}):(1-G^{-1})(1-G^{-2})(1-G^{-4})$, where the value of G is chosen to increase the free spectral tuning range of the filter while maintaining sufficient off-band rejection.

18. A two-cavity electro-optic tunable filter, comprising:
    a first electro-optically tunable plate, including a first incident surface and a first emergent surface;
    a second electro-optically tunable plate parallel to said first plate, including a second incident surface and a second emergent surface;
    an incident reflective coating on said first incident surface;
    an emergent reflective coating on said second emergent surface; and
    an absorbent film disposed between said first and second plates and in mating contact with said first emergent surface and said second incident surface.

19. A two-cavity electro-optic tunable filter, comprising:
    a first electro-optically tunable crystal of a thickness $l_1$, having a first incident surface and a first emergent surface;
    an incident reflecting electrode on said first incident surface;
    a second electro-optically tunable crystal of a thickness $l_2$, having a second incident surface and a second emergent surface;
    an emergent reflecting electrode on said second emergent surface; and
    an absorbent metallic film disposed between said first and second crystals and in contact with said first emergent surface and said second incident surface, such that $l_2=(1-G^{-1})l_1$, where G is chosen to increase the free spectral tuning range of the filter while maintaining sufficient off-band rejection.

* * * * *